(12) United States Patent (10) Patent No.: US 8,438,947 B2
Yamanaka et al. (45) Date of Patent: May 14, 2013

(54) BICYCLE CRANK ARM

(75) Inventors: Masahiro Yamanaka, Izumiotsu (JP); Eigo Kuroiwa, Sakai (JP); Tetsu Nonoshita, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/267,919

(22) Filed: Oct. 7, 2011

(65) Prior Publication Data

US 2013/0087011 A1 Apr. 11, 2013

(51) Int. Cl.
*B62M 3/00* (2006.01)

(52) U.S. Cl.
USPC .......................................................... 74/594.1

(58) Field of Classification Search .................. 74/594.1, 74/594.2, 594.3; 280/259; 403/338
See application file for complete search history.

(56) References Cited

U.S. PATENT DOCUMENTS

| 5,010,785 | A * | 4/1991 | Romero | 74/594.1 |
| 6,755,095 | B2 * | 6/2004 | Yamanaka | 74/594.1 |
| 7,527,277 | B2 | 5/2009 | Nonoshita et al. | |
| 2004/0200314 | A1 | 10/2004 | Hermansen et al. | |
| 2008/0224440 | A1 * | 9/2008 | Masuda et al. | 280/259 |

FOREIGN PATENT DOCUMENTS

| CN | 2277928 Y | 4/1998 |
| EP | 1 120 336 A2 | 8/2001 |
| EP | 1 712 462 A1 | 10/2006 |

* cited by examiner

*Primary Examiner* — Richard W Ridley
*Assistant Examiner* — Richard V Wu
(74) *Attorney, Agent, or Firm* — Global IP Counselors (57) ABSTRACT

A bicycle crank arm has a body member and a cover member that at least partially overlies a peripheral surface of the body member. The body member includes a crank axle attachment portion that has a crank axle receiving opening. A slit extends from the peripheral surface of the body member to the crank axle receiving opening. A fastener bore extends transversely through the slit for adjusting the crank axle receiving opening in size. The peripheral surface of the body member has abutments located on opposite sides of the slit. The abutments are arranged relative to the slit such that the abutments move closer together as the crank axle attachment portion is squeezed to decrease the crank axle receiving opening in size. The cover member contacts the abutments and moves with the abutments as the crank axle attachment portion is squeezed to decrease the crank axle receiving opening in size.

9 Claims, 8 Drawing Sheets

FIG. 18

BICYCLE CRANK ARM

BACKGROUND

1. Field of the Invention

This invention generally relates to a bicycle crank arm. More specifically, the present invention relates to a bicycle crank arm constructed of two or more pieces to reduce weight as compared to a solid metal bicycle crank arm.

2. Background Information

Generally speaking, a conventional bicycle has a diamond-shaped bicycle frame with a pair of wheels rotatably mounted to the frame and a drive train coupled to the frame for driving the rear wheel. The drive train typically has a bicycle crank assembly that is mounted to a cylindrical or tubular hanger tube of the bicycle frame such that the rear wheel is rotated by the rider applying a pedaling force to the bicycle crank assembly. In particular, this pedaling action of the bicycle crank assembly drives a chain that rotates a sprocket mounted to the rear wheel. The bicycle crank assembly usually includes a crank axle that is mounted in a freely rotatable-manner to the hanger tube of the bicycle frame. A crank arm is fastened to each end of the crank axle. The right crank arm typically has one or more sprockets that is attached thereto thr driving the chain, and is fixed to the right end of the crank axle. On the other hand, the left crank arm typically does not include a sprocket and is releasably attached to the left end of the crank axle. As used herein, the terms "right" and "left" are often used to describe bicycle components on the assumption that the bicycle is viewed from the rear.

In the past, the crank arms were typically solid metal members. However, such solid metal crank arms are typically quite heavy. In the bicycle field, bicycle riders are constantly demanding lighter bicycle components in order to decrease the overall weight of the bicycle. In response to this demand, bicycle component manufacturers have produced lighter crank arms by using non-metallic materials and/or providing a hollow space in a body member of the crank arm. The hollow space in the body member of the crank arm is sometimes covered with a cover member.

In view of the above, it will be apparent to those skilled in the art from this disclosure that there exists a need for an improved bicycle crank arm that is lighter than solid metal bicycle crank arm. This invention addresses this need in the art as well as other needs, which will become apparent to those skilled in the art from this disclosure.

SUMMARY

One aspect presented in this disclosure is to provide a light weight crank arm that is clamped to a crank and that is still durable.

In view of the state of the known technology, a bicycle crank arm is provided that comprises a body member and a cover member. The body member includes an inner side surface, an outer side surface and a peripheral surface extending between the inner and outer side surfaces. The cover member at least partially overlies the peripheral surface of the body member. The body member further includes a crank axle attachment portion, a slit and at least one fastener bore. The crank axle attachment portion has a crank axle receiving opening extending from the inner side surface of the body member. The slit extends from the peripheral surface of the body member to the crank axle receiving opening. The fastener bore extends transversely through the slit for adjusting the crank axle receiving opening in size. The peripheral surface of the body member has first and second abutments located on opposite sides of the slit. The first and second abutments are arranged relative to the slit such that the first and second abutments move closer together as the crank axle attachment portion is squeezed to decrease the crank axle receiving opening in size. The cover member contacts the first and second abutments and moving with the first and second abutments as the crank axle attachment portion is squeezed to decrease the crank axle receiving opening in size.

These and other objects, features, aspects and advantages of the bicycle crank arm presented in this disclosure will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
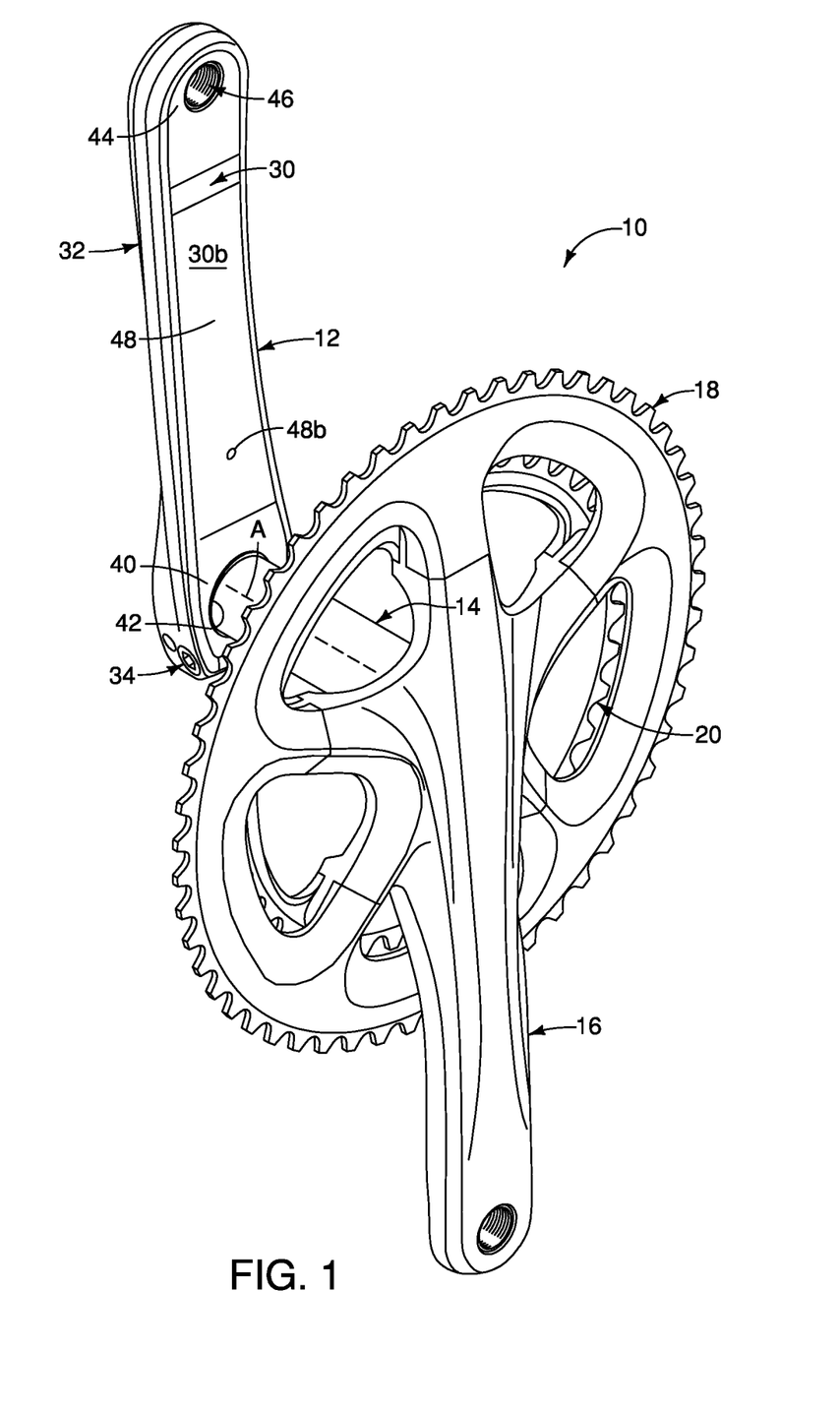
FIG. 1 is an assembled perspective view of a bicycle crank assembly with a bicycle crank arm in accordance with a first embodiment.

Referring to initially to FIG. 1, a bicycle crank axle assembly 10 is illustrated that includes a first crank arm 12 in accordance with a first embodiment. The bicycle crank axle assembly 10 further includes a crank axle 14 that has a first end 14a fixed to the first crank arm 12 in a releasable and reinstallable manner as discussed below. The bicycle crank axle assembly 10 further includes a second crank arm 16 coupled to the other end of the crank axle 14 in a conventional manner (e.g., crimping, locking ring, adhesive, etc.). In the first illustrated embodiment, the second crank arm 16 has a first sprocket 18 and a second sprocket 20 thereto in a conventional manner (e.g., ring nuts and ring bolts).

Since the crank axle 14, the second crank arm 16 and the sprockets 18 and 20 are relatively conventional components, these components will not be described and/or illustrated in detail herein. Moreover, the first crank arm 12 is not limited to the particular configuration of the crank axle 14, the second crank arm 16 and the sprockets 18 and 20 that are illustrated herein. For example, while in the first illustrated embodiment, the second crank arm 16 is provided with the sprockets 18 and 20, it will be apparent to those skilled in the art from this disclosure that the first crank arm 12 can be provided with a sprocket attachment if needed and/or desired.

The crank axle 14 is rotatably supported in a hanger tube (not shown) by a bottom bracket (not shown) for rotation about a center rotational axis A of the bottom bracket. The bottom bracket is a conventional structure, and thus, the bottom bracket will not be discussed or illustrated in detail herein. Rather, the following description will primarily focus on the first crank arm 12.

As seen in FIGS. 2 to 5, in the first illustrated embodiment, the first crank arm 12 includes a body member 30 and a cover member 32 that are fixedly coupled together by bonding (e.g., adhesive, welding, brazing, etc.) to define an interior space that can be empty, partly filled or completely with a plastic resin material or any other suitable filler material. The body member 30 includes an outer side surface 30a, an inner side surface 30b and a peripheral surface 30c that extending between the outer and inner side surfaces 30a and 30b. The cover member 32 at least partially overlies the peripheral surface 30c of the body member 30. More preferably, the cover member 32 at least partially overlies the peripheral surface 30c and at least partially overlies one of the outer and inner side surfaces 30a and 30b. In the first illustrated embodiment, the cover member 32 substantially covers the entire exterior area of the inner side surface 30b and the peripheral surface 30c.

In the first illustrated embodiment, the body member 30 and the cover member 32 are both formed of a suitable metallic material such as a stainless steel, an aluminum alloy, a magnesium alloy, a titanium alloy, etc. However, the body member 30 and the cover member 32 are not limited to metallic materials. Rather, the body member 30 and the cover member 32 can be formed of any other suitable rigid materials such as a fiber-reinforced resin, preferably a carbon fiber-reinforced resin. Thus, each of the body member 30 and the cover member 32 can be made of a suitable metallic material, a suitable non-metallic material and/or a combination of suitable non-metallic and metallic materials, if needed and/or desired.

Figure 2:
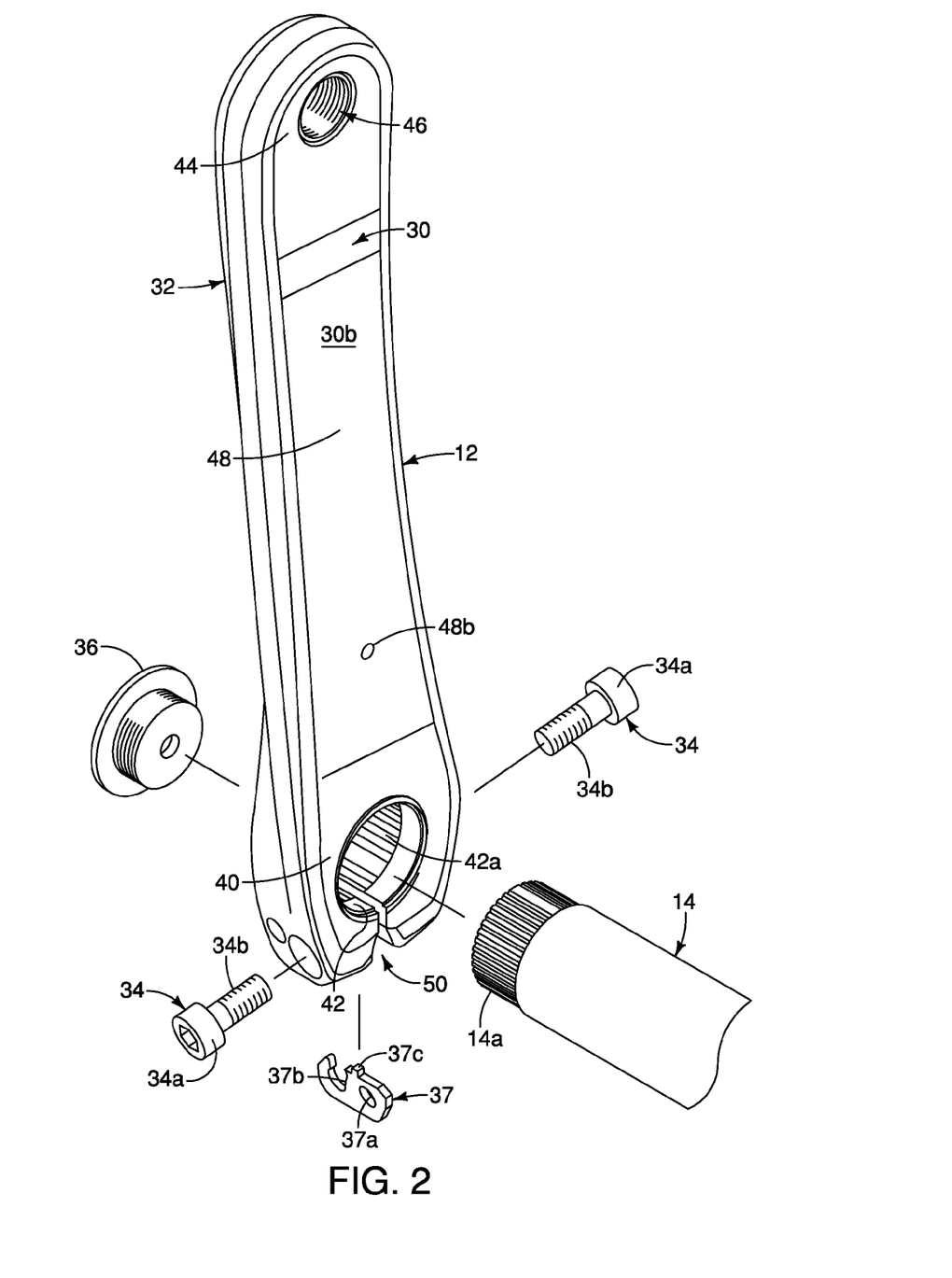
FIG. 2 is an exploded perspective of the bicycle crank arm and a portion of the crank axle illustrated in FIG. 1.
Figure 3:
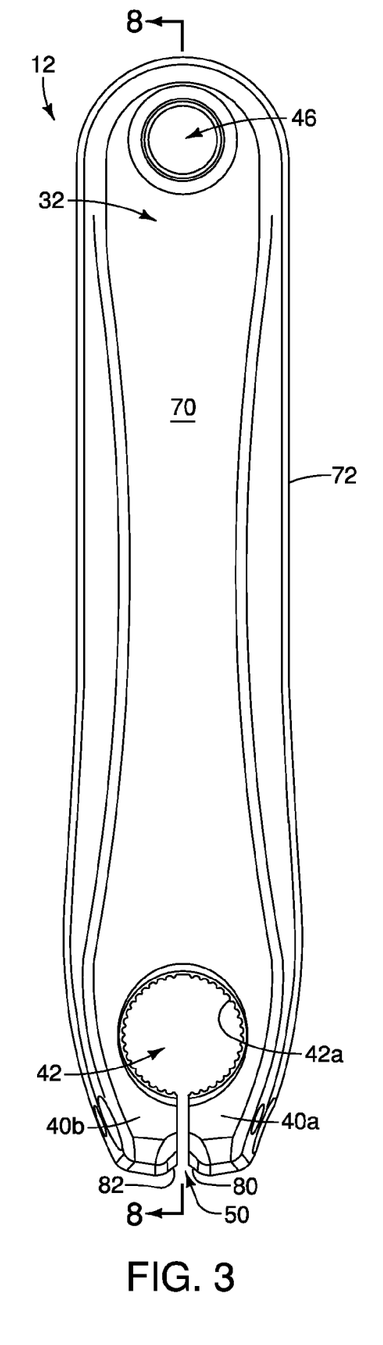
FIG. 3 is an outside elevational view of the bicycle crank arm illustrated in FIGS. 1 and 2.
Figure 4:
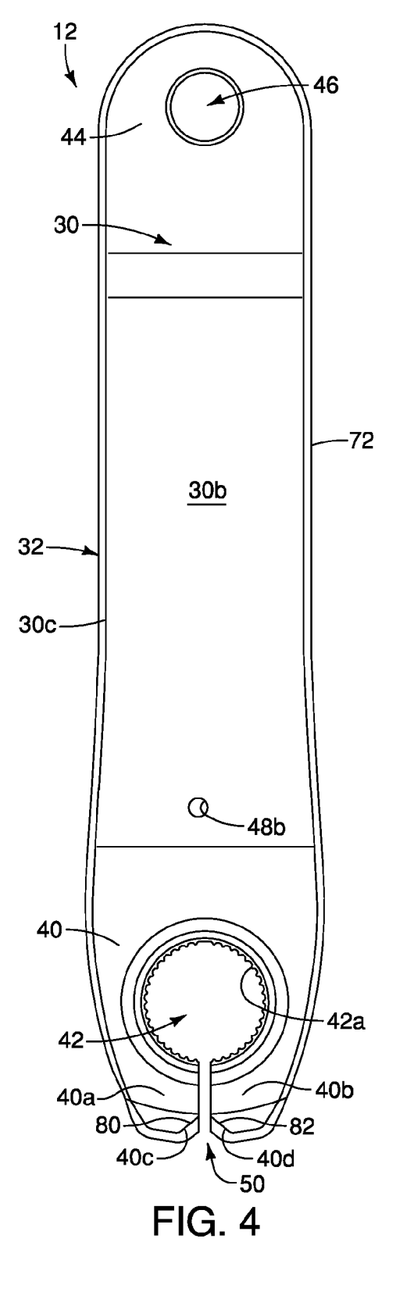
FIG. 4 is an inside elevational view of the bicycle crank arm illustrated in FIGS. 1 to 3.
Figure 5:
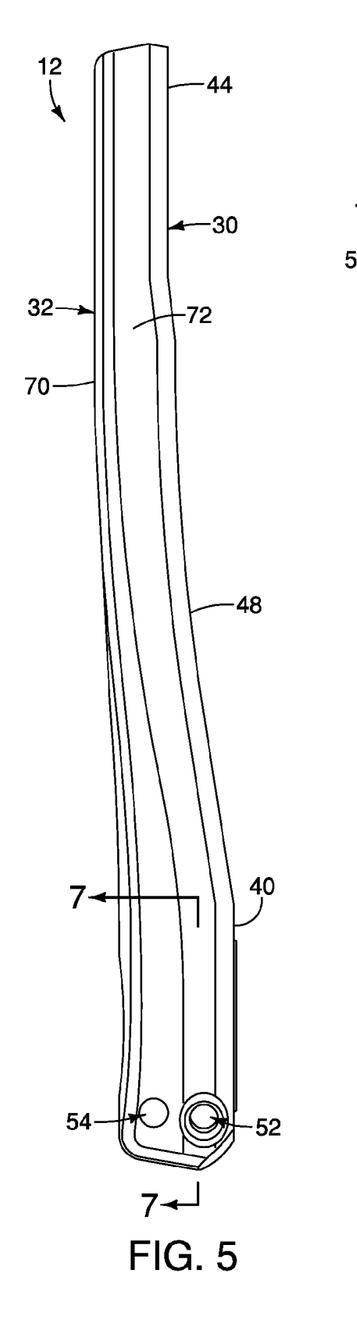
FIG. 5 is an edge elevational view of the bicycle crank arm illustrated in FIGS. 1 to 4.

As seen in FIG. 2, the first crank arm 12 includes a pair of mounting fasteners 34 (e.g., clamp bolts) for attached the first crank arm 12 to the first end 14a of the crank axle 14 in a releasable and reinstallable manner as discussed below. As explained later, the cover member 32 is attached to the body member 30 such that the cover member 32 does not separate from the body member 30 during attachment of the first crank arm 12 to the first end 14a of the crank axle 14 using the mounting fasteners 34.

Preferably, the first crank arm 12 is also secured to the first end 14a of the crank axle 14 with a fixing bolt 36. Optionally, the first crank arm 12 includes a retaining member 37 which is a plate-shaped member for preventing the first crank arm 12 from drop off from the crank axle 14 even if the fasteners 34 become loose and the fixed bolt 36 has fallen off. The retaining member 37 has a through hole 37a for receiving one of the fastener 34 therethrough, a locking notch 37b for receiving the other one of the fastener 34 therethrough, and a retaining lug 37c for engaging a retaining hole (not shown) in the crank axle 14. The retaining member 37 is a conventional structure and thus will not be discussed in further detail herein.

Figure 11:
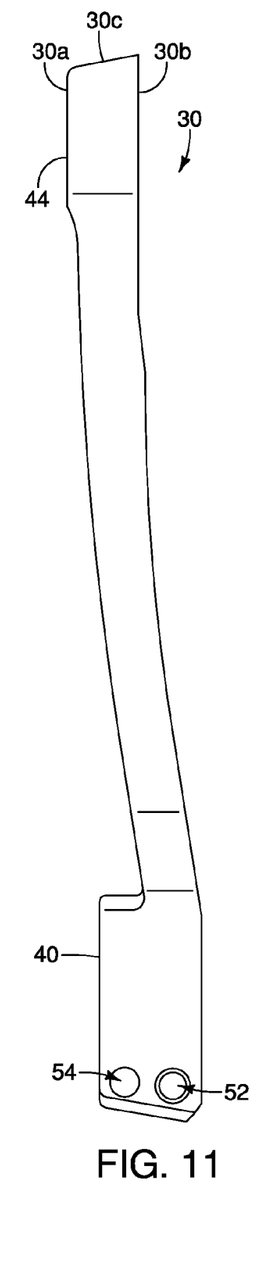
FIG. 11 is an edge elevational view of the body member for the bicycle crank arm illustrated in FIGS. 1 to 8.
Figure 12:
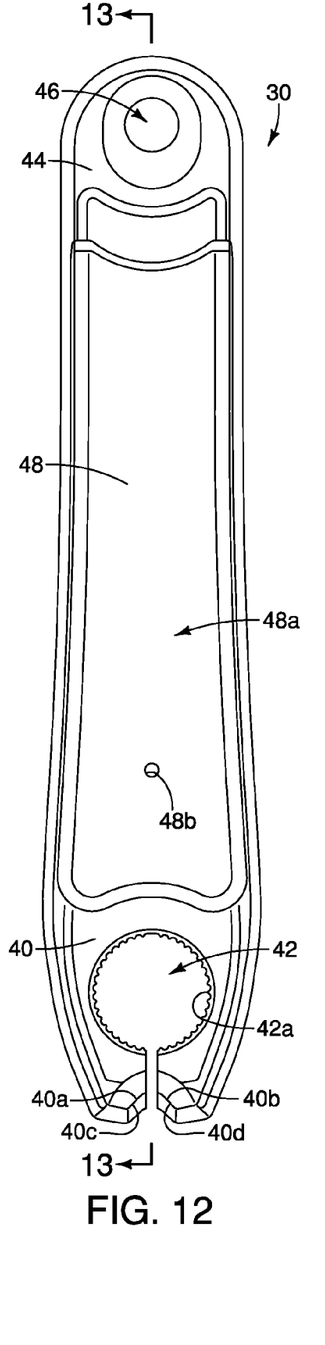
FIG. 12 is an internal elevational view of the body member illustrated in FIG. 11.
Figure 13:
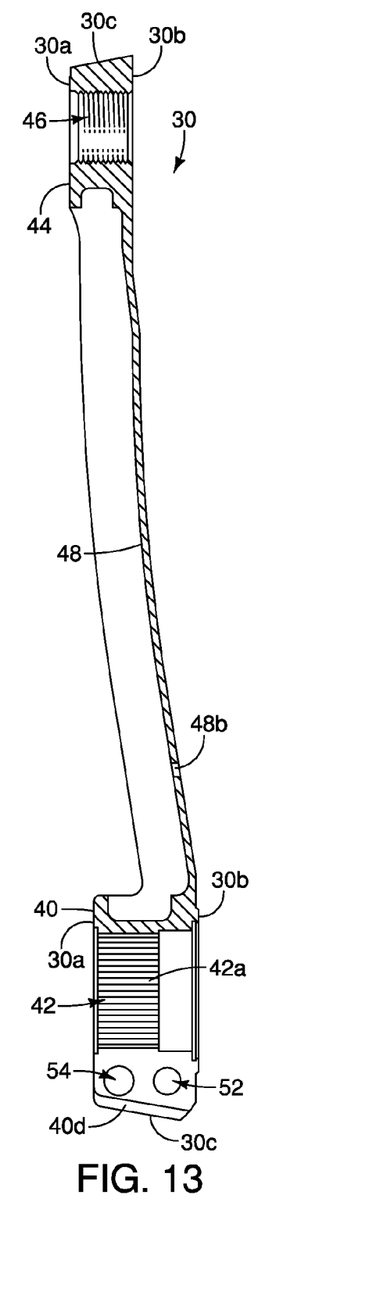
FIG. 13 is a longitudinal cross sectional view of the body member illustrated in FIGS. 11 and 12 as seen along section line 13-13 of FIG. 12.

As best seen in FIGS. 11 to 13, the body member 30 includes a crank axle attachment portion 40 that has a crank axle receiving opening 42. The body member 30 further includes a pedal attachment portion 44 that has a pedal receiving opening 46. In this first embodiment, the body member 30 further includes an arm portion 48 connecting the crank axle attachment portion 40 and the pedal attachment portion 44 together. The crank axle attachment portion 40, the pedal attachment portion 44 and the arm portion 48 are preferably integrally formed as a one-piece, unitary member from a metallic material as illustrated in this first embodiment. However, the body member 30 can be formed of several pieces as needed and/or desired. Moreover, the body member 30 can be formed of various materials as needed and/or desired.

Figure 8:
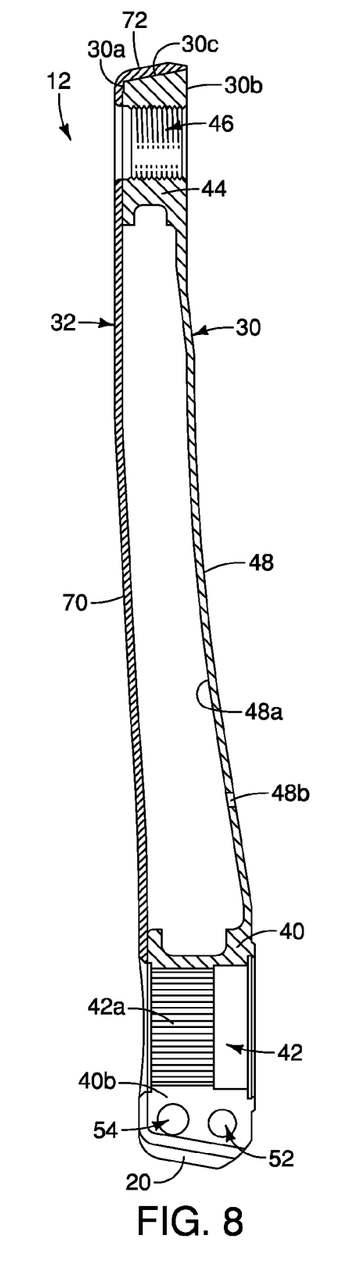
FIG. 8 is a longitudinal cross sectional view of a bicycle crank arm in illustrated in FIGS. 1 to 7.
Figure 10:
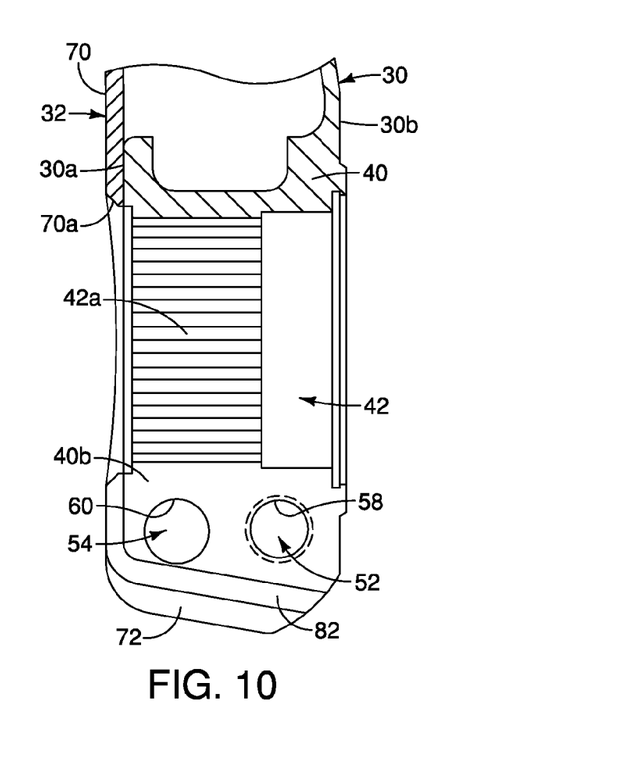
FIG. 10 is an enlarged, longitudinal cross sectional view of the crank axle attachment portion of the bicycle crank arm in illustrated in FIGS. 1 to 8.

As seen in FIGS. 8 and 10, the crank axle receiving opening 42 extends completely through the crank axle attachment portion 40 from the outer side surface 30a to the inner side surface 30b. However, the crank axle attachment portion 40 of the body member 30 can be configured such that the crank axle receiving opening 42 does not extend completely through the crank axle attachment portion 40 from the outer side surface 30a to the inner side surface 30b. Rather, the crank axle attachment portion 40 needs only to extend from a sufficient amount from the inner side surface 30b to securely attach the first end 14a of the crank axle 14 using the mounting fasteners 34. The crank axle receiving opening 42 has a plurality of splines 42a for engaging splines on the first end 14a of the crank axle 14 to prevent rotation therebetween.

As best seen in FIGS. 3 to 7, the crank axle attachment portion 40 also has a slit 50 and a first fastener bore 52 and a second fastener bore 54. The slit 50 extends from the peripheral surface 30c of the body member 30 to the crank axle receiving opening 42 such that the crank axle attachment portion 40 is divided into a first part 40a and a second part 40b. Preferably, the radial slit 50 is a radial slit that extends radially with respect to the axis of the crank axle receiving opening 42. The fastener bores 52 and 54 extend transversely through the slit 50 for receiving one of the mounting fasteners 34 to adjust the crank axle receiving opening 42 in size. These two mounting fasteners 34 are, for example, hexagon socket head bolts, and their heads 34a are preferably inserted from different directions with respect to the slit 50 as explained below. The first crank arm 12 is clamped onto the first end 14a of the crank axle 14 by tightening the mounting fasteners 34 to squeeze the first and second parts 40a and 40b together and reducing the transverse width of the slit 50. In other words, the transverse width of the slit 50 is narrowed by tightening the mounting bolts 34 that extend across the slit 50 to clamp onto the first end 14a of the first crank arm 12 on the crank axle 14. With this arrangement, the first crank arm 12 is strongly clamped onto the first end 14a of the crank axle 14 by tightening up the two mounting fasteners 34. Optionally, the retaining member 37 is installed on the mounting fasteners 34 in the slit 50 for preventing the first crank arm 12 from drop off from the crank axle 14 even if the fasteners 34 become loose and the fixed bolt 36 has fallen off. For the sake of clarity, the retaining member 37 is not shown in the installed position in FIG. 7.

Figure 7:
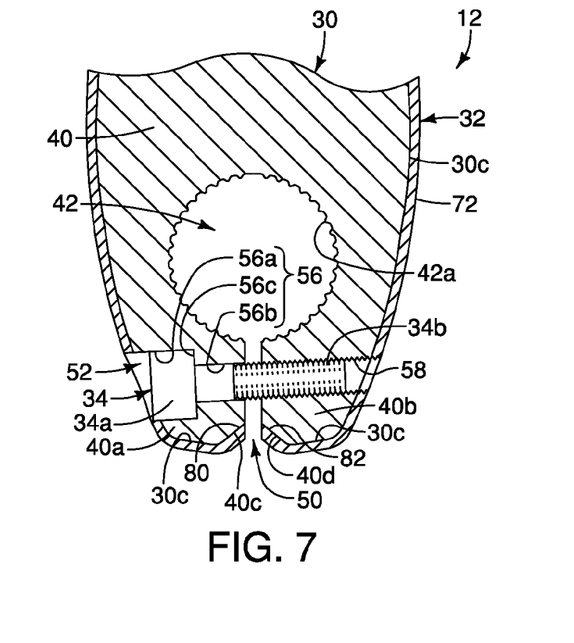
FIG. 7 is an enlarged transverse cross sectional view of the bicycle crank arm illustrated in FIGS. 1 to 6 as seen along section line 7-7 of FIG. 5, but with the mounting fasteners (e.g., bolts) installed in the fastener receiving bores of the bicycle crank arm.

In particular, the first fastener bore 52 has a first bore portion 56 formed in the first part 40a on one side of the slit 50 and a second bore portion 58 formed in the second part 40b on the other side of the slit 50. The first bore portion 56 is a stepped bore that includes a head receiving section 56a, a shaft receiving section 56b and a radial abutment surface 56c extending between the head receiving section 56a and the shaft receiving section 56b. The head receiving section 56a has a larger width or diameter than the width or diameter of the shaft receiving section 56b. In this way, the head 34a of one of the mounting fasteners 34 is located within the head receiving section 56a and abuts the radial abutment surface 56c that extends between the head receiving section 56a and the shaft receiving section 56b. The second bore portion 58 is preferably a threaded bore that threadedly engages a threaded shaft portion 34b of one of the mounting fasteners 34. However, the second bore portion 58 can be unthreaded and a separate nut (not shown) can be provided that is threaded onto the threaded shaft portion 34b of one of the mounting fasteners 34.

Similarly, the second fastener bore 54 has a first bore portion 60 formed in the second part 40b on one side of the slit 50 and a second bore portion 62 formed in the first part 40a on the other side of the slit 50. The first bore portion 60 is a stepped bore that is identical to the first bore portion 56, but formed in the second part 40b instead of the first part 40b. Thus, the first bore portion 60 includes a head receiving section, a shaft receiving section and a radial abutment surface for receiving one of the mounting fasteners 34 in the same manner as discussed above with respect to the first bore portion 56.

Figure 6:
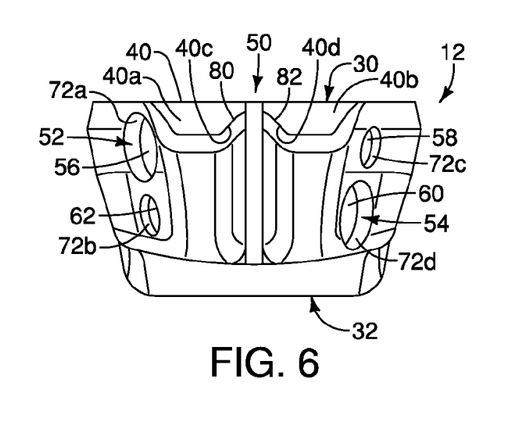
FIG. 6 is an enlarged end elevational view of the bicycle crank arm illustrated in FIGS. 1 to 5.

As best seen in FIGS. 6 and 7, the peripheral surface 30c of the body member 30 has a first abutment 40c formed on the first part 40a, which is located on one side of the slit 50, and a second abutment 40d formed on the second part 40b which is located on the other side of the slit 50. In other words, the first and second abutments 40c and 40d are located on opposite sides of the slit 50. The first and second abutments 40c and 40d are arranged relative to the slit 50 such that the first and second abutments 40c and 40d move closer together as the mounting bolts 34 are tightened to narrow the slit 50 and decrease the crank axle receiving opening 42 in size. As explained below, the cover member 32 contacts the first and second abutments 40c and 40d such that the cover member 32 moves with the first and second abutments 40c and 40d as the crank axle attachment portion 40 is squeezed to decrease the crank axle receiving opening 42 in size. In this way, the separation of the cover member 32 from the body member 30 does not occur from the first and second parts 40a and 40b of the crank axle attachment portion 40 being squeezed together when securing the first crank arm 12 to the crank axle 14. The first and second abutments 40c and 40d are preferably angled relative to the slit 50 such that the first and second abutments 40c and 40d diverge with respect to each other as the first and second abutments 40c and 40d extend from the slit 50. This inclined arrangement of the first and second abutments 40c and 40d aids in attaching the cover member 32 to the body member 30 while still ensuring that the cover member 32 from the body member 30 do not separate when securing the first crank arm 12 to the crank axle 14.

Figure 9:
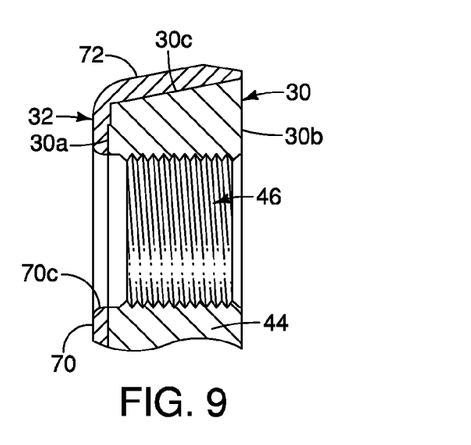
FIG. 9 is an enlarged, longitudinal cross sectional view of the pedal attachment portion of the bicycle crank arm in illustrated in FIGS. 1 to 8.

As seen in FIGS. 8 and 9, the pedal receiving opening 46 of the pedal attachment portion 44 is preferably threaded for threadedly attaching a pedal (not shown). Of course, it will be apparent to those skilled in the art from this disclosure that the configuration of the pedal attachment portion 44 depends on the type of pedal that is being used. Since most pedals have a spindle with a threaded portion, the pedal attachment portion 44 has been illustrated with the pedal receiving opening 46 having an internal thread. However, the first crank arm 12 is not limited to the pedal attachment portion 44 having such a configuration.

As best seen in FIGS. 11 to 13, the arm portion 48 of the body member 30 is integrally formed with the crank axle attachment portion 40 and the pedal attachment portion 44. The arm portion 48 has a recessed area or cavity 48a that extends between the crank axle attachment portion 40 and the pedal attachment portion 44. When the cover member 32 is fixed to the body member 30, the recessed area or cavity 48a is enclosed such that the first crank arm 12 is hollow along a majority of its longitudinal length. Optionally, a hole 48b can be provided in the arm portion 48 for filling the recessed area or cavity 48a with a filler material, such as a lightweight plastic foam material. Thus, the interior space of the first crank arm 12 can be empty or filled, as needed and/or desired.

Figure 14:
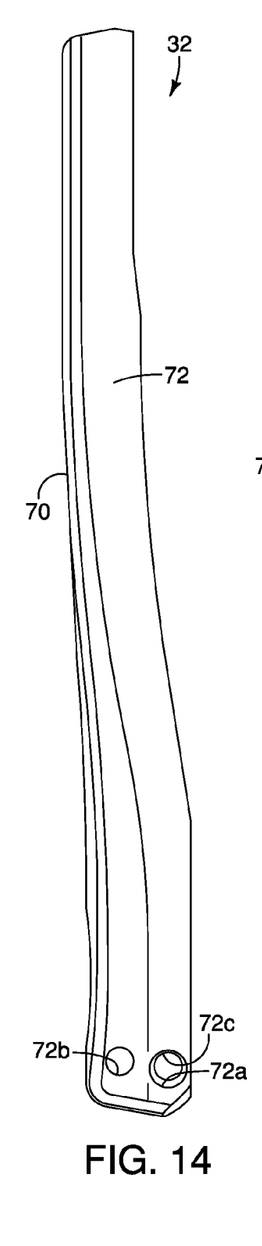
FIG. 14 is an edge elevational view of the cover member for the bicycle crank arm illustrated in FIGS. 1 to 8.
Figures 15, 16:
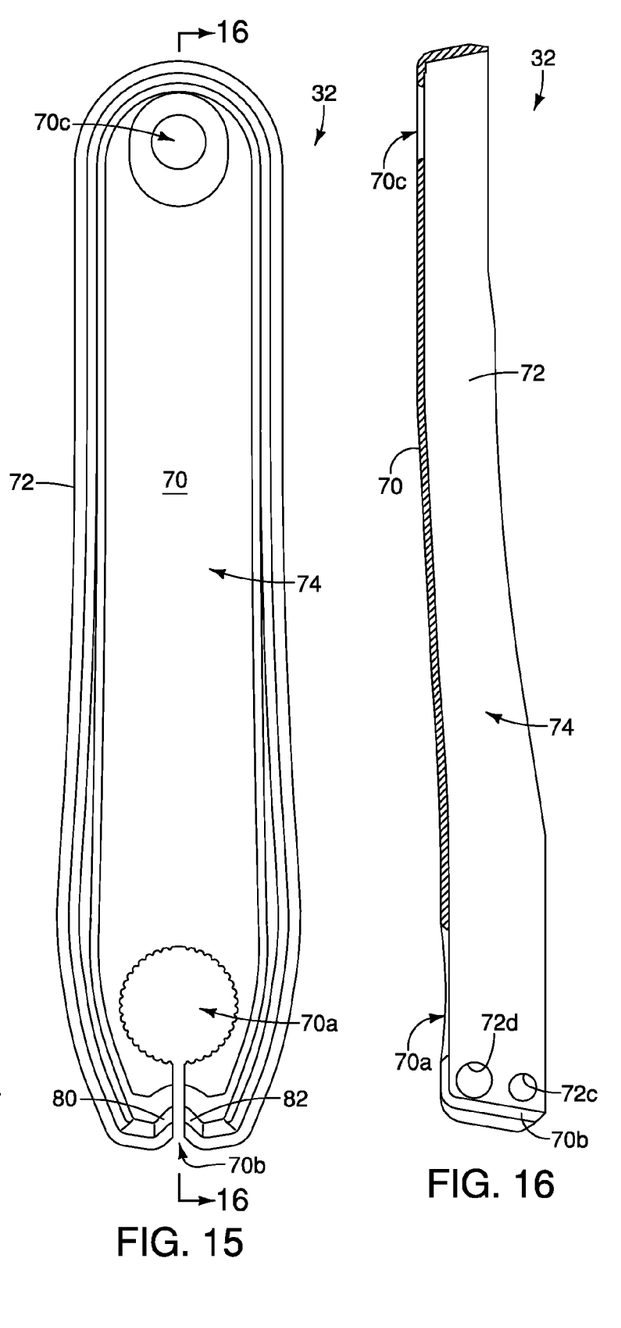
FIG. 15 is an internal elevational view of the cover member illustrated in FIG. 14.
FIG. 16 is a longitudinal cross sectional view of the cover member illustrated in FIGS. 14 and 12 as seen along section line 16-16 of FIG. 15.

Turning now to FIGS. 14 to 16, the cover member 32 will now be discussed in more detail. In the first embodiment, the cover member 32 includes a first cover section 70 and a second cover section 72. The first cover section 70 and the second cover section 72 are preferably integrally formed as a one-piece, unitary member from a metallic material or any other suitable material. However, the cover member 32 can be formed of several pieces as needed and/or desired. By forming the cover member 32 of several pieces, the cover member 32 can be formed of various materials as needed and/or desired. Also the precise configuration of the cover member 32 can vary depending on the construction and/or shape of the body member 30. However, as mentioned above, the configuration of the cover member 32 should be configured to contact the first and second abutments 40c and 40d such that the cover member 32 moves with the first and second abutments 40c and 40d as the crank axle attachment portion 40 is squeezed to decrease the crank axle receiving opening 42 in size. In this way, the separation of the cover member 32 from the body member 30 does not occur from the first and second parts 40a and 40b of the crank axle attachment portion 40 being squeezed together when securing the first crank arm 12 to the crank axle 14.

The second cover section 72 extends from the peripheral edge of the first cover section 70 to form a body receiving cavity 74. With this arrangement, the first cover section 70 substantially overlies the outer side surface 30a of the body member 30, while the second cover section 72 substantially overlies the peripheral surface 30c of the body member 30. However, the cover member 32 is not limited to this configuration. For example, the second cover section 72 can be configured to only overlies the peripheral surface 30c of the body member 30 that is along the crank axle attachment portion 40.

Since the cover member 32 overlies and mates the body member 30, the cover member 32 has various structures that correspond to structures of the body member 30. In particular, the first cover section 70 is provided with a first opening 70a and a slit 70b that align with the crank axle receiving opening 42 and the slit 50 of the body member 30. The first cover section 70 is further provided with a second opening 70c that aligns with the pedal receiving opening 46 of the body member 30. The second cover section 72 is also provided with a four apertures 72a, 72b, 72c and 72d surrounds the fastener insertion openings of the first and second fastener bores 52 and 54.

As seen in FIGS. 6 and 7, the second cover section 72 further includes a first contact portion 80 and a second contact portion 82. The first and second contact portions 80 and 82 overlie the first and second abutments 40c and 40d. Since the first and second abutments 40c and 40d partially face each other with respect to the tightening axes of the fasteners 34, the first and second abutments 40c and 40d contact and pull the first and second contact portions 80 and 82 together as the first and second parts 40a and 40b are squeezed together by the mounting fasteners 34. In this way, the body member 30 and the cover member 32 remain together during attachment of the first crank arm 12 to the first end 14a of the crank axle 14 using the mounting fasteners 34. In other words, the cover member 32 is prevent from separating from the body member 30 during attachment of the first crank arm 12 to the first end 14a of the crank axle 14 using the mounting fasteners 34.

Figure 17:
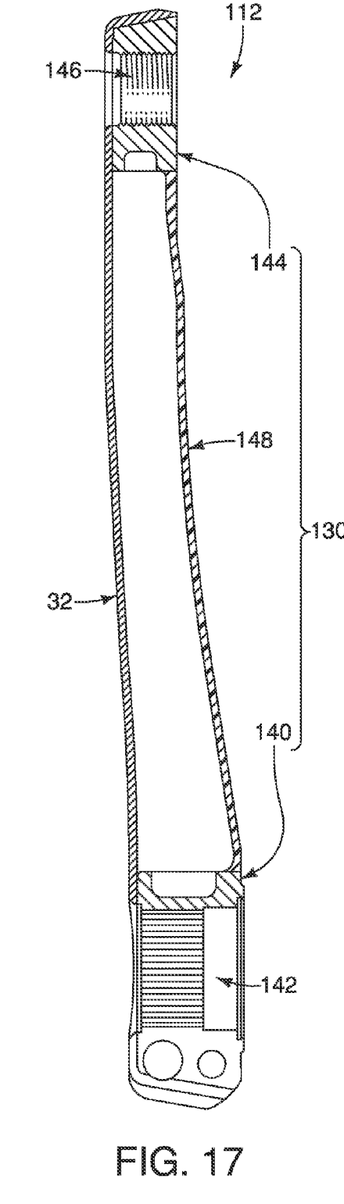
FIG. 17 is a longitudinal cross sectional view of a bicycle crank arm in accordance with a second embodiment.
Figure 18:
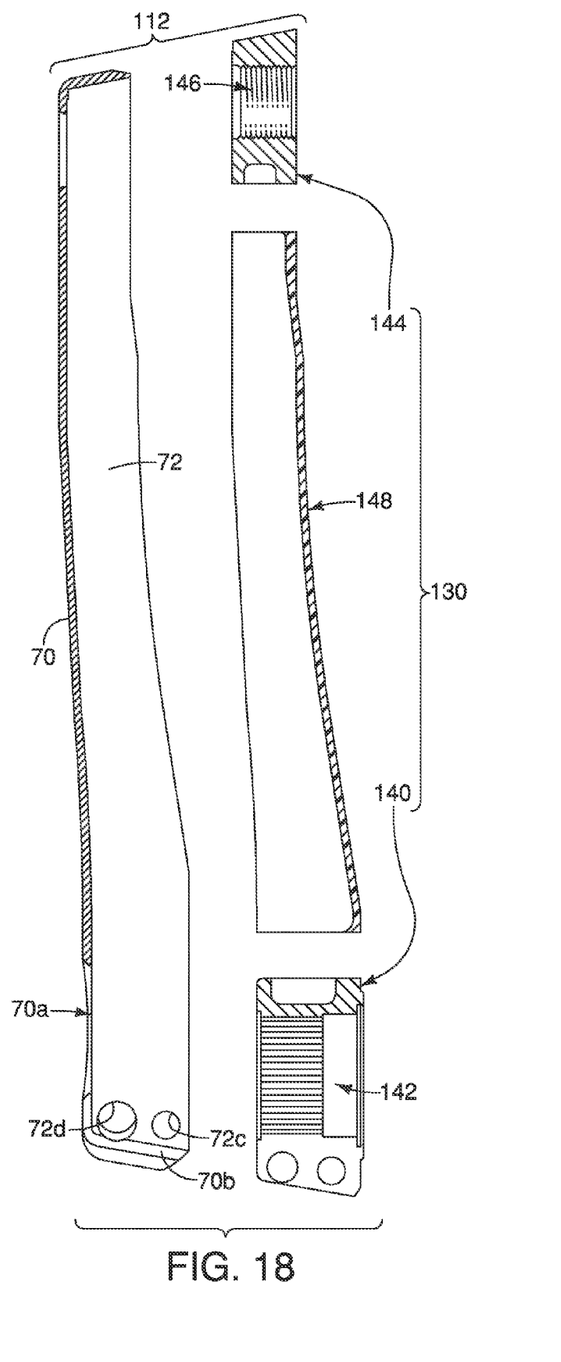
FIG. 18 is an exploded, longitudinal cross sectional view of the bicycle crank arm illustrated in FIG. 17.

Referring now to FIGS. 17 and 18, a crank arm 112 in accordance with a second embodiment will now be explained. The crank arm 112 includes a modified body member 130 and the cover member 32 from the first embodiment. The body member 130 and the cover member 32 are fixedly coupled together by bonding (e.g., adhesive, welding, brazing, etc.) to define an interior space that can be empty, partly filled or completely with a plastic resin material or any other suitable filler material. However, the crank arm 112 only differs from the first crank arm 12, discussed above, in that the body member 130 is formed of several pieces instead of being a one-piece member as in the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the body member 130 includes a crank axle attachment portion 140 that has a crank axle receiving opening 142. The body member 130 further includes a pedal attachment portion 144 that has a pedal receiving opening 146. In this second embodiment, the crank axle attachment portion 140 and the pedal attachment portion 144 are separate parts that are connected together by an arm portion 148. The arm portion 148 is also a separate part from the crank axle attachment portion 140 and the pedal attachment portion 144. In other words, the crank axle attachment portion 140 and the pedal attachment portion 144 are each formed as a separate member from the arm portion 148. Moreover, with this construction, the crank axle attachment portion 140, the pedal attachment portion 144 and arm portion 148 can be each formed of a different material as needed and/or desired. For example, in the second illustrated embodiment, the crank axle attachment portion 140 and the pedal attachment portion 144 are both metal members, while the arm portion 148 is a non-metallic member that is formed of a suitable material such as a carbon reinforced resin.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle crank arm. Accordingly, these terms, as utilized to describe the bicycle crank arm should be interpreted relative to a bicycle equipped with the bicycle crank arm as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank arm comprising:
a body member including an inner side surface, an outer side surface and a peripheral surface extending between the inner and outer side surfaces, and
a cover member at least partially overlying the peripheral surface of the body member,
the body member further including a crank axle attachment portion having a crank axle receiving opening extending from the inner side surface of the body member, a slit extending from the peripheral surface of the body member to the crank axle receiving opening and at least one fastener bore extending transversely through the slit for adjusting the crank axle receiving opening in size,
the peripheral surface of the body member having first and second abutments located on opposite sides of the slit, the first and second abutments being arranged relative to the slit such that the first and second abutments move closer together as the crank axle attachment portion is squeezed to decrease the crank axle receiving opening in size, the cover member contacting the first and second abutments and moving with the first and second abutments as the crank axle attachment portion is squeezed to decrease the crank axle receiving opening in size.

2. The bicycle crank arm according to claim 1, wherein
the first and second abutments are angled relative to the slit such that the first and second abutments diverge with respect to each other as the first and second abutments extend from the slit.

3. The bicycle crank arm according to claim 1, wherein
the body member further including a pedal attachment portion.

4. The bicycle crank arm according to claim 3, wherein
the body member further including an arm portion connecting the crank axle attachment portion and the pedal attachment portion.

5. The bicycle crank arm according to claim 4, wherein
the arm portion, the crank axle attachment portion and the pedal attachment portion are formed as a one-piece, unitary member.

6. The bicycle crank arm according to claim 1, wherein
the cover member is provided with an aperture that surrounds a fastener insertion opening of the at least one fastener bore.

7. The bicycle crank arm according to claim 1, wherein
the at least one fastener bore includes first and second bores extending transversely through the slit, the first bore having a first bore portion with a head receiving section formed in a first part of the crank axle attachment portion on one side of the slit and a second bore portion formed in a second part of the crank axle attachment portion on the other side of the slit, and the second bore having a first bore portion with a head receiving section formed in the second part of the crank axle attachment portion on the other side of the slit and a second bore portion formed in the first part of the crank axle attachment portion on the one side of the slit.

8. The bicycle crank arm according to claim 7, wherein
the cover member is provided with apertures that surround fastener insertion openings of the first and second fastener bores.

9. The bicycle crank arm according to claim 1, wherein
the cover member is disposed at least partially axially between the first and second abutments with respect to an axial direction of the at least one fastener bore.

\* \* \* \* \*